US012673476B2

(12) United States Patent
Lou et al.

(10) Patent No.: US 12,673,476 B2
(45) Date of Patent: Jul. 7, 2026

(54) TEMPLATE AS WELL AS MANUFACTURING METHOD AND USE, INTERMEDIATE STRUCTURE AND LITHIUM SECONDARY BATTERY ELECTRODE

(71) Applicant: GUANGDONG GENIUS TECHNOLOGY CO., LTD., Dongguan (CN)

(72) Inventors: Linzhen Lou, Dongguan (CN); Chunli Shang, Dongguan (CN)

(73) Assignee: GUANGDONG GENIUS TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 18/915,210

(22) Filed: Oct. 14, 2024

(65) Prior Publication Data

US 2025/0033318 A1     Jan. 30, 2025

Related U.S. Application Data

(63) Continuation of application No. PCT/CN2022/113077, filed on Aug. 17, 2022.

(30) Foreign Application Priority Data

Jun. 14, 2022    (CN) .......................... 202210672975.3

(51) Int. Cl.
*H01M 4/04* (2006.01)
*B32B 3/26* (2006.01)
(Continued)

(52) U.S. Cl.
CPC ................ *B32B 3/266* (2013.01); *B32B 7/12* (2013.01); *B32B 15/08* (2013.01); *B32B 15/09* (2013.01);
(Continued)

(58) Field of Classification Search
None
See application file for complete search history.

(56) References Cited

U.S. PATENT DOCUMENTS 8,440,350 B1 *  5/2013  Verbrugge ............ H01M 4/134
                                                429/209
2003/0150384 A1   8/2003  Baude et al.
(Continued)

FOREIGN PATENT DOCUMENTS

CN          1633518 A      6/2005
CN        101136466 A      3/2008
(Continued)

OTHER PUBLICATIONS

Dobrev et al., Electrochemical preparation of metal microstructures on large areas of etched ion track membranes, Nuclear Instruments and Methods in Physics Research Section B: Beam Interactions with Materials and Atoms, vol. 149, pp. 207-212, dated Dec. 31, 1999.
(Continued)

*Primary Examiner* — Tracy M Dove
(74) *Attorney, Agent, or Firm* — Westbridge IP LLC

(57) ABSTRACT

Disclosed are a template as well as a manufacturing method and use, an intermediate structure of a lithium secondary battery electrode and a lithium secondary battery electrode. The template is used for preparing the lithium secondary battery electrode on one surface and/or two surfaces. The manufacturing method for the template includes the following steps: laminating a film material on a substrate, and allowing the film material to be formed with through holes, central axes of the through holes being perpendicular to a plane where the substrate is located; where the substrate is a conductive substrate, and the film material is a flexible polymer thin film. When used for preparing the lithium secondary battery electrode, the template has the advantages
(Continued)

of low manufacturing cost, convenient large-area synthesis, suitability for mass production, etc.

8 Claims, 5 Drawing Sheets

(51) Int. Cl.

| | |
|---|---|
| *B32B 7/12* | (2006.01) |
| *B32B 15/08* | (2006.01) |
| *B32B 15/09* | (2006.01) |
| *B32B 15/20* | (2006.01) |
| *B32B 27/28* | (2006.01) |
| *B32B 27/36* | (2006.01) |
| *H01M 4/1395* | (2010.01) |
| *H01M 4/36* | (2006.01) |
| *H01M 4/62* | (2006.01) |

(52) U.S. Cl.

CPC ............ *B32B 15/20* (2013.01); *B32B 27/281* (2013.01); *B32B 27/36* (2013.01); *B32B 27/365* (2013.01); *H01M 4/0423* (2013.01); *H01M 4/0433* (2013.01); *H01M 4/045* (2013.01); *H01M 4/366* (2013.01); *H01M 4/625* (2013.01); *H01M 4/626* (2013.01); *H01M 4/628* (2013.01); *B32B 2255/10* (2013.01); *B32B 2255/205* (2013.01); *B32B 2255/26* (2013.01); *B32B 2255/28* (2013.01); *B32B 2307/7376* (2023.05); *B32B 2457/10* (2013.01)

(56) References Cited

U.S. PATENT DOCUMENTS

| 2007/0148337 | A1 | 6/2007 | Nichols et al. |
|---|---|---|---|
| 2008/0102359 | A1 | 5/2008 | Kogetsu et al. |
| 2009/0316335 | A1 | 12/2009 | Simon et al. |
| 2011/0097623 | A1 | 4/2011 | Marinis, Jr. et al. |
| 2011/0189510 | A1 | 8/2011 | Caracciolo et al. |
| 2013/0130077 | A1 | 5/2013 | El-ashry et al. |
| 2014/0050988 | A1 | 2/2014 | Wei et al. |
| 2014/0342236 | A1 | 11/2014 | Goyal |
| 2015/0144494 | A1 | 5/2015 | Verbrugge et al. |
| 2020/0006779 | A1 | 1/2020 | Lee et al. |

FOREIGN PATENT DOCUMENTS

| CN | 101713916 | A | 5/2010 |
|---|---|---|---|
| CN | 102007617 | A | 4/2011 |
| CN | 103219490 | A | 7/2013 |
| CN | 104737331 | A | 6/2015 |
| CN | 105247704 | A | 1/2016 |
| CN | 108089398 | A | 5/2018 |
| CN | 110168794 | A | 8/2019 |
| JP | 2010262843 | A | 11/2010 |
| WO | 2012076963 | A1 | 6/2012 |

OTHER PUBLICATIONS

First Office Action issued in counterpart Chinese Patent Application No. 202210672975.3, dated May 31, 2024.

International Search Report issued in corresponding PCT Application No. PCT/CN2022/113077, dated Dec. 20, 2022.

Notification to Grant Patent Right for Invention issued in counterpart Chinese Patent Application No. 202210672975.3, dated Dec. 11, 2024.

Second Office Action issued in counterpart Chinese Patent Application No. 202210672975.3, dated Aug. 22, 2024.

* cited by examiner

TEMPLATE AS WELL AS MANUFACTURING METHOD AND USE, INTERMEDIATE STRUCTURE AND LITHIUM SECONDARY BATTERY ELECTRODE

CROSS-REFERENCE TO RELATED APPLICATIONS

This application is a continuation of International Application No. PCT/CN2022/113077, filed on Aug. 17, 2022, which claims priority to Chinese Patent Application No. 202210672975.3, filed on Jun. 14, 2022, both of which are hereby incorporated by reference in their entireties.

TECHNICAL FIELD

This application relates to the technical field of lithium battery materials, and in particular to a template as well as a manufacturing method and use, an intermediate structure of a lithium secondary battery electrode and a manufacturing method therefor, and a lithium secondary battery electrode and a manufacturing method therefor.

BACKGROUND

Nanowires and microwires are typical one-dimensional materials, and their preparation methods mainly include an etching method, a self-growth method and a template method. The etching method and the self-growth method cannot ensure the consistency of the one-dimensional materials, and the one-dimensional materials may grow disorderly and may be prone to agglomeration, so it is difficult to apply the etching method and the self-growth method on a large scale. The template method frequently uses an anodized aluminum oxide template to manufacture one-dimensional materials.

However, due to the manufacturing process and structural characteristics of anodized aluminum oxide, the manufacturing cost is high, and it is difficult to manufacture a large-area anodized aluminum oxide template, which makes it only limited to the laboratory research stage and difficult to realize mass production.

SUMMARY

Examples of this application disclose a template as well as a manufacturing method and use, an intermediate structure of a lithium secondary battery electrode and a manufacturing method therefor, and a lithium secondary battery electrode and a manufacturing method therefor, in order to solve the problem that the process for synthesizing one-dimensional materials by the template method is only limited to laboratory research and difficult to realize industrialization. Examples of this application disclose a template as well as a manufacturing method and use, an intermediate structure of a lithium secondary battery electrode and a manufacturing method therefor, and a lithium secondary battery electrode and a manufacturing method therefor, in order to solve the problem that the process for synthesizing one-dimensional materials by the template method is only limited to laboratory research and difficult to realize industrialization.

In a first aspect, an example of this application provides a manufacturing method for a template. The template is used for preparing a lithium secondary battery electrode on one surface or two surfaces. The manufacturing method for a template includes the following steps: laminating a film material on a substrate, and allowing the film material to be formed with through holes, central axes of the through holes being perpendicular to a plane where the substrate is located; where the substrate is a conductive substrate, and the film material is a flexible polymer thin film.

Further, the manufacturing method for a template includes the following steps: bonding the film material onto the substrate through an adhesive layer, and allowing both the film material and the adhesive layer to be formed with the through holes.

Further, the manufacturing method for a template includes the following steps:

treating the film material by ion track etching to obtain the through holes, and printing or spraying the adhesive layer on the film material having the through holes, the adhesive layer at least partially exposing the through holes; and bonding the film material formed with the adhesive layer to the substrate through the adhesive layer by hot pressing to obtain the template.

Further, the manufacturing method for a template includes the following steps:

applying the adhesive layer to the film material not formed with the through holes, and treating the film material with the adhesive layer by ion track etching such that both the adhesive layer and the film material are formed with the through holes; and bonding the film material formed with the through holes to the substrate through the adhesive layer formed with the through holes by hot pressing to obtain the template.

Further, the manufacturing method for a template includes the following steps:

applying the adhesive layer to the film material not formed with the through holes;

bonding the film material formed with the adhesive layer to the substrate through the adhesive layer by hot pressing; and treating the film material bonded to the substrate and the adhesive layer by ion track etching such that the film material and the adhesive layer are formed with the through holes.

Further, conditions of the ion track etching include: using heavy ion bombardment, irradiation being carried out under an irradiation power of 2000 KW to 10000 KW for 0.5 s to 200 s.

Further, the conditions of the ion track etching include: an etching solution being an alkaline solution, and an etching time being 5 min to 30 min.

Further, the adhesive layer is at least one of polyvinylidene difluoride (PVDF) or a conductive adhesive.

Further, the manufacturing method for a template includes the following steps:

treating the film material by ion track etching to obtain the through holes;

pre-plating a first metal layer on the film material formed with the through holes by physical vapor deposition; and electroplating a second metal layer on the first metal layer to form the substrate such that the film material formed with the through holes is plated with the substrate to form the template.

Further, a hole diameter of the through holes is 10 nm to 50 μm, and/or a hole density of the through holes is $10^5/cm^2$ to $10^8/cm^2$, and/or a thickness of the film material is 2 μm to 50 μm, and/or a length-to-diameter ratio of the thickness of the film material to the hole diameter of the through holes is 1:3 to 3:1.

Further, the hole diameter of the through holes is 5 μm to 30 μm, and/or the hole density of the through holes is 0.4 million/cm$^2$ to 2 million/cm$^2$, and/or the thickness of the film material is 15 μm to 50 μm, and/or the length-to-diameter ratio of the thickness of the film material to the hole diameter of the through holes is 1:1 to 3:1.

Further, the manufacturing method for a template includes the following steps:

carrying out an impurity removal pretreatment on the substrate;

applying a dry film to one surface and/or two surfaces of the pretreated substrate; and exposing, developing and etching the dry film to obtain the template with the dry film formed with the through holes.

Further, a hole diameter of the through holes is 5 μm to 30 μm, and/or a thickness of the film material is 5 μm to 30 μm, and/or a length-to-diameter ratio of the thickness of the film material to the hole diameter of the through holes is 1:3 to 3:1, and/or a hole spacing between the adjacent through holes is 5 μm to 20 μm.

Further, the substrate is at least one of a copper foil substrate, a nickel foil substrate or a stainless steel substrate.

Further, the polymer thin film is at least one of a poly tetra fluoroethylene (PTFE) thin film, a polyethylene glycol terephthalate (PET) thin film, a polypropylene (PP) thin film, a polycarbonate (PC) thin film or a polyimide (PI) thin film.

In a second aspect, an example of this application provides a template. The template is used for preparing a lithium secondary battery electrode on one surface or two surfaces. The template is prepared by the manufacturing method for a template according to the first aspect.

Further, the template includes a substrate and a film material laminated on the substrate. The film material has through holes, the substrate is a conductive substrate, and the film material is a flexible polymer thin film.

Further, the template further includes an adhesive layer bonded between the substrate and the film material. The adhesive layer is PVDF or a conductive adhesive, and the adhesive layer also has the through holes such that the adhesive layer at least does not cover the through holes of the film material.

In an embodiment, a hole diameter of the through holes is 10 nm to 50 μm, and/or a hole density of the through holes is 10$^5$/cm$^2$ to 10$^8$/cm$^2$, and/or a thickness of the film material is 2 μm to 50 μm, and/or a length-to-diameter ratio of the thickness of the film material to the hole diameter of the through holes is 1:3 to 3:1.

Preferably, the hole diameter of the through holes is 5 μm to 30 μm, and/or the hole density of the through holes is 0.4 million/cm$^2$ to 2 million/cm$^2$, and/or the thickness of the film material is 15 μm to 50 μm, and/or the length-to-diameter ratio of the thickness of the film material to the hole diameter of the through holes is 1:1 to 3:1.

In an embodiment, a hole diameter of the through holes is 5 μm to 30 μm, and/or

A thickness of the film material is 5 μm to 30 μm, and/or a length-to-diameter ratio of the thickness of the film material to the hole diameter of the through holes is 1:3 to 3:1, and/or a hole spacing between the adjacent through holes is 5 μm to 20 μm.

In a third aspect, an example of this application provides use of a template. The template is prepared by the manufacturing method for a template according to the first aspect, the template is used for preparing an intermediate structure of a lithium secondary battery electrode, and the intermediate structure includes a substrate and one-dimensional columnar structures perpendicularly grown on the substrate.

In a fourth aspect, an example of this application provides use of a template. The template is prepared by the manufacturing method for a template according to the first aspect, and the template is used for preparing a lithium secondary battery electrode.

In a fifth aspect, an example of this application provides a manufacturing method for an intermediate structure of a lithium secondary battery electrode, including the following steps: growing a conductive material in through holes of the template prepared by the manufacturing method according to the first aspect such that one-dimensional columnar structures perpendicular to a substrate are formed in the through holes; and removing a film material in the template to obtain the intermediate structure.

Further, the conductive material is grown in the through holes by one of physical vapor deposition, electroplating, chemical plating or chemical vapor deposition.

Further, the conductive material is at least one of copper, nickel or carbon.

Further, the film material is removed by one of mechanical stripping, chemical etching or vacuum sintering.

In a sixth aspect, an example of this application provides an intermediate structure of a lithium secondary battery electrode. The intermediate structure is prepared by the manufacturing method for an intermediate structure according to the fifth aspect, and the intermediate structure includes a substrate and one-dimensional columnar structures perpendicularly grown on the substrate.

Further, a diameter of the one-dimensional columnar structures is 5 μm to 30 μm, a height of the one-dimensional columnar structures is 15 μm to 50 μm, and a height-to-diameter ratio of the one-dimensional columnar structures is 3:1 to 1:1.

Further, the one-dimensional columnar structures include a plurality of regularly distributed columns, and a spacing between the adjacent columns is 5 μm to 20 μm, or the one-dimensional columnar structures include a plurality of irregularly distributed columns.

In a seventh aspect, an example of this application provides a manufacturing method for a lithium secondary battery electrode, including the following steps:

growing a conductive material in through holes of the template prepared by the manufacturing method according to the first aspect such that one-dimensional columnar structures are formed in the through holes;

removing a film material in the template to obtain an intermediate structure in which the one-dimensional columnar structures are grown on a substrate;

covering an outer surface of each of the one-dimensional columnar structures with an electrode active material to form an active material layer; and covering an outer surface of the active material layer with a protective layer to obtain the lithium secondary battery electrode.

Further, the electrode active material is at least one of silicon, germanium or tin.

Further, a material of the protective layer is carbon or metal oxide.

Further, the outer surface of each of the one-dimensional columnar structures is covered with the electrode active material by chemical vapor deposition, physical vapor deposition or electroplating.

Further, the outer surface of the active material layer is covered with the protective layer by a hydrothermal process, physical vapor deposition or chemical vapor deposition.

In an eighth aspect, an example of this application provides a lithium secondary battery electrode. The lithium secondary battery electrode is prepared by the manufacturing method for a lithium secondary battery electrode according to the seventh aspect. The lithium secondary battery electrode includes:

a substrate, the substrate being a conductive substrate;

one-dimensional columnar structures, growing on the substrate and perpendicular to a plane where the substrate is located, the one-dimensional columnar structures being conductive one-dimensional columnar structures;

an active material layer, located on the substrate and perpendicular to the plane where the substrate is located, and covering an outer surface of each of the one-dimensional columnar structures; and a protective layer, located on the substrate and perpendicular to the plane where the substrate is located, and covering an outer surface of the active material layer.

Compared with the related art, the examples of this application have the following advantages.

According to the manufacturing method for a template used in the preparation of a lithium secondary battery electrode on one surface and/or two surfaces in the example of this application, the film material with the through holes is laminated on the conductive substrate, so that the one-dimensional columnar structure materials such as nanowires or microwires can be grown in the through holes in the subsequent process. Moreover, the substrate, such as the copper foil substrate, the nickel foil substrate or the stainless steel substrate, which has certain strength, can play a good mechanical supporting role for the one-dimensional columnar structure materials in the subsequent preparation of the lithium secondary battery electrode. More importantly, the film material, which is a flexible polymer thin film, not only has the advantage of low manufacturing cost, but also can realize mass production as it can be made into a coiled material due to its softness, which is convenient for synthesis of the large-area template.

BRIEF DESCRIPTION OF THE DRAWINGS

To describe the technical solutions of the examples of this application more clearly, the following briefly introduces the accompanying drawings required for describing the examples.

Apparently, the accompanying drawings in the following description show only some examples of this application, and a person of ordinary skill in the art may still derive other drawings from these accompanying drawings without creative efforts.

DETAILED DESCRIPTION OF THE EMBODIMENTS

Figure 1:
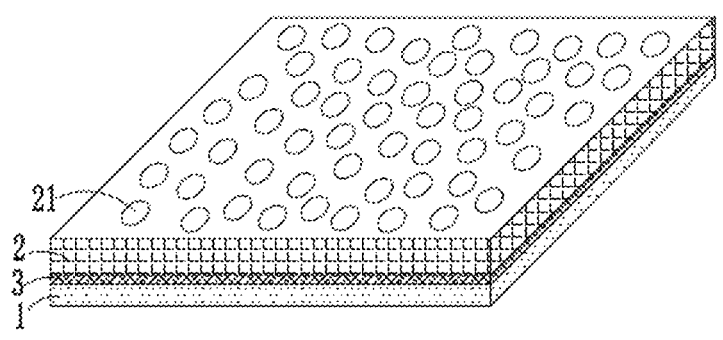
FIG. 1 is a schematic structural view of a template according to Example I.

The technical solutions in the examples of the disclosure will be clearly and completely described below with reference to the accompanying drawings in the examples of the disclosure. It is apparent that the described examples are only a part, rather than all of the examples of the disclosure. All other examples obtained by those of ordinary skill in the art based on the examples of the disclosure without creative work are within the protection scope of the disclosure.

In the disclosure, the orientation or positional relationship indicated by the terms "upper", "lower", "left", "right", "front", "rear", "top", "bottom", "inner", "outer", "middle", "vertical", "horizontal", "transverse", "longitudinal", etc. is based on the orientation or positional relationship shown in the accompanying drawings. These terms are mainly for the convenience of describing the disclosure and examples thereof, rather than indicating or implying that the device or element referred to must have a particular orientation or be constructed and operated in a particular orientation.

Besides, some of the above terms may be used to indicate not only the orientation or positional relationship, but also the other meanings. For example, the term "upper" may also be used to indicate a certain dependency or connection relationship in some cases. Those of ordinary skill in the art may understand the specific meanings of these terms in the disclosure according to specific situations.

In addition, the terms "mounted", "arranged", "provided", "connected to" and "connected with" should be understood in a broad sense, which, for example, may be in the form of a fixed connection, a detachable connection or an integral construction; or a mechanical connection or an electrical connection; or a direct connection or an indirect connection through an intermediate medium; or an internal communication between two devices, elements or components. Those of ordinary skill in the art may understand the specific meanings of the above terms in the disclosure according to specific situations.

In addition, the terms such as "first" and "second" are mainly used to distinguish different devices, elements or components (the specific types and structures may be the same or different), and are not intended to indicate or imply the relative importance and quantity of the devices, elements or components referred to. Unless otherwise stated, "a plurality of" means two or more than two.

The technical solutions of this application will be described in detail below in conjunction with specific examples and accompanying drawings.

In the related techniques of synthesis of one-dimensional materials by the template method, the most studied one is the synthesis of one-dimensional materials by using an anodized aluminum oxide template. The anodized aluminum oxide template is usually prepared by anodizing a high-purity aluminum sheet in an acidic solution. Due to the manufacturing process and structural characteristics of the anodized aluminum oxide template, it has the following limitations: First, the manufacturing cost is high. Second, after in-depth study and practical research, the applicant understands that it is difficult to manufacture a large-area anodized aluminum oxide template in industrial production, and at present, the maximum size of the anodized aluminum oxide template is only at the unit level of cm*cm. These two limitations make the research on the synthesis of one-dimensional materials using an anodized aluminum oxide template mainly focus on the laboratory research stage such as universities and institutes, and make it difficult for related techniques to be applied in industrial mass production. Thus, with the template method, it is difficult to synthesize one-dimensional materials in mass and apply one-dimensional materials to the lithium secondary battery electrode material, which ultimately limits the optimization and upgrading of the lithium secondary battery electrode material in actual industrial production.

Based on the analysis of the problems above, examples of this application provide a template for preparing a lithium secondary battery electrode as well as a manufacturing method and use, an intermediate structure of a lithium secondary battery electrode and a manufacturing method therefor, and a lithium secondary battery electrode and a manufacturing method therefor, so as to finally realize the structural optimization and upgrading of the battery electrode material in actual industrial mass production by solving the problem that it is difficult for the template to be used on a large scale in actual industrial production.

In a first aspect, an example of this application provides a template. The template is used for preparing a lithium secondary battery electrode on one surface and/or two surfaces. The template includes a substrate and a film material laminated on the substrate. The film material has through holes, and central axes of the through holes are perpendicular to a plane where the substrate is located. The substrate is a conductive substrate, and the film material is a flexible polymer thin film.

The manufacturing method for a template includes the following steps: laminating a film material on a substrate, and allowing the film material to be formed with through holes, central axes of the through holes being perpendicular to a plane where the substrate is located. The substrate is a conductive substrate, and the film material is a flexible polymer thin film.

The substrate is at least one of a copper foil substrate, a nickel foil substrate or a stainless steel substrate, and preferably, the substrate is a copper foil substrate or a nickel foil substrate. The polymer thin film is at least one of a PTFE thin film, a PET thin film, a PP thin film, a PC thin film or a PI thin film, and preferably, the polymer thin film is a PET thin film.

The template is used for preparing a lithium secondary battery electrode on one surface and/or two surfaces" means that the film material with through holes may be laminated on one surface of the substrate, thereby preparing the lithium secondary battery electrode by using one surface of the template; or the film material with through holes may be respectively laminated on two opposite surfaces of the substrate, thereby preparing the lithium secondary battery electrode by using two surfaces of the template.

According to the manufacturing method for a template used in the preparation of a lithium secondary battery electrode on one surface and/or two surfaces in the example of this application, the film material with the through holes is laminated on the conductive substrate, so that the one-dimensional columnar structure materials such as nanowires or microwires can be grown in the through holes in the subsequent process. Moreover, the substrate, such as the copper foil substrate, the nickel foil substrate or the stainless steel substrate, which has certain strength, can play a good mechanical supporting and electrical connection role for the one-dimensional columnar structure materials in the subsequent preparation of the lithium secondary battery electrode. More importantly, the film material, which is a flexible polymer thin film, not only has the advantage of low manufacturing cost, but also can realize mass production as it can be made into a coiled material due to its softness, which is convenient for synthesis of the large-area template. For example, in a realizable production scene, a large-area substrate is located on a conveyor belt of the production process, and a commercially purchased film material (i.e., a flexible polymer thin film) is installed on a roller in the form of a coiled material. By laminating the film material on the substrate and making the film material formed with through holes, a large-area template is prepared. The large area refers to a size of dm×dm or above, and may also refer to a size of m×m. The larger the area, the more favorable it is to reduce the cost of mass production.

Thereby, compared with the preparation of one-dimensional materials using the anodized aluminum oxide template, the manufacturing method and the template prepared using the same according to the examples of this application at least have the following significant advantages in the aspect of industrial mass production.

Firstly, optimization of material characteristics and processes makes the template easier to realize through industrial mass production. On the one hand, as described above, according to this example of this application, the flexible polymer thin film, which is flexible and rollable, is used as the film material, so that the large-area large-scale industrial mass production of the template can be realized, which is difficult to realize by the anodized aluminum oxide template. On the other hand, this example of this application, which directly uses the conductive material as the conductive substrate, has the advantage of simplified manufacturing process as compared with the related art which realizes the conductive function by sputtering a metal layer on a non-conductive substrate such as a glass substrate.

Secondly, optimization of the product performance makes the lithium secondary battery electrode prepared subsequently more cost-effective and more suitable for mass production. On the one hand, according to this example of this application, the substrate can be firmly attached to the film material by bonding, which can ensure the operational stability of the subsequent perforation process and avoid affecting the perforation effect or the structural stability of the template because the substrate and the film material are easily separated. On the other hand, in this application, the adhesive layer is perforated to ensure the through holes of the film material to be in communication with the conductive substrate, thereby ensuring the direct contact between the one-dimensional columnar structures of the subsequent intermediate structure of the lithium secondary battery and the conductive substrate. In addition, the conductive substrate is directly used as the substrate, so the overall conductivity is good. However, when making one-dimensional materials using the anodized aluminum oxide template, even though bonding is used, the adhesive layer is not perforated, so the generated one-dimensional nano materials cannot directly contact the substrate in deed, which makes the conductivity of the overall structure lower.

Moreover, as can be seen from microstructure parameters (such as hole diameter, film thickness, length-to-diameter ratio and hole density) of the through holes in the template according to this example of this application and SEM images of the templates prepared according to specific examples of this application hereinafter, the one-dimensional columnar structures that can be prepared by using the template according to this example of this application are closer to short and thick columns on the micron level, which can keep the one-dimensional columnar structures in good perpendicularity with respect to the conductive substrate and make the columns spaced apart. However, the one-dimensional nano materials prepared by using the anodized aluminum oxide template are more likely to grow into long and thin microstructures having a smaller diameter and a larger height. Such structures have the problems of easy agglomeration at the ends of adjacent one-dimensional nano materials and poor perpendicularity with respect to the substrate, thereby making such one-dimensional nano materials not suitable to be used as an intermediate structure to prepare the lithium secondary battery electrode.

In an optional embodiment, the manufacturing method for a template includes the following steps: bonding the film material onto the substrate through an adhesive layer, and allowing both the film material and the adhesive layer to be formed with the through holes.

The adhesive layer is at least one of polyvinylidene difluoride (PVDF) or a conductive adhesive.

By arranging the adhesive layer on the film material, the film material can be reliably connected with the substrate through the adhesive layer, and mass production of the manufacturing process of the template can be realized. More importantly, in this example of this application, the adhesive layer is specially treated. The adhesive layer is also formed with through holes corresponding to the film material, i.e., the adhesive layer is also formed with the through holes corresponding to the through holes in the film material. In other words, the adhesive layer can realize reliable connection between the film material and the substrate without blocking the communication between the through holes and the substrate. In this way, when growing one-dimensional columnar structure materials such as nanowires or microwires in the through holes subsequently, these one-dimensional columnar structure materials can have good contact with the conductive substrate, thereby realizing mass production and ensuring good electrical contact between the one-dimensional columnar structure materials and the conductive substrate. In addition, the applicant found that in the related art, special perforation is rarely performed on the adhesive layer. It is speculated that, on the one hand, the related art does not pay attention to the communication between the through holes and the substrate of the template. Even if perforation is performed, the perforation is performed on the carbon layer on the substrate by sintering, which has low porosity and not obvious perforation effect, increasing the difficulty in subsequent electroplating or deposition of the conductive material in the holes. More importantly, this is different from the concept of directly perforating the adhesive layer in this application. On the other hand, in the related art, if the film material and the adhesive layer are to be removed without perforating the adhesive layer, leaving only the substrate and the grown one-dimensional materials, then more complicated operations are needed, including removing the film material and then removing the adhesive layer. However, the process of removing the adhesive layer will affect the stability of connection between the grown one-dimensional materials and the substrate, such that the one-dimensional materials will become separated from the substrate and even collapse and agglomeration will occur to part of the one-dimensional materials, which is not conducive to the improvement of the performance of the lithium secondary battery electrode prepared subsequently.

It should be noted that the through holes correspondingly formed in the adhesive layer may completely expose the through holes of the film material (i.e., the adhesive layer does not cover the through holes of the film layer at all), or partially expose the through holes of the film material (i.e., the adhesive layer makes the through holes of the film layer partially covered and partially exposed), as long as there is a space for the through holes to be exposed, thereby ensuring the communication between the through holes and the conductive substrate and further ensuring good electrical contact between the one-dimensional columnar structure materials and the conductive substrate during the subsequent synthesis of the one-dimensional columnar structure materials.

In addition, the applicant would like to emphasize that the anodized aluminum oxide template is limited by its synthesis process. Aluminum oxide columns are usually made into hollow aluminum oxide tubes first, and then a substrate is formed on the hollow aluminum oxide tubes to form the anodized aluminum oxide template, which makes the anodized aluminum oxide template only be able to synthesize the lithium secondary battery electrode on one surface of the substrate. However, in this example of this application, by connecting the film material and the substrate through the adhesive layer by bonding, the film material with through holes may be laminated on one surface of the substrate, thereby preparing the lithium secondary battery electrode on one surface of the template, or the film material with through holes may be respectively laminated on two surfaces of the substrate, thereby preparing the lithium secondary battery electrode on two surfaces of the template. While mass production of the template and the lithium secondary battery electrode is realized, the lithium secondary battery electrode can be prepared on two surfaces of the template, which is difficult to realize in the prior art and is one of the important innovative points of this example of this application.

Three specific implementations of bonding the film material to the substrate through the adhesive layer will be described below.

In a first embodiment, the manufacturing method for a template includes the following steps: treating the film material by ion track etching to obtain the through holes, and printing or spraying the adhesive layer on the film material having the through holes, the adhesive layer at least partially exposing the through holes; and bonding the film material formed with the adhesive layer to the substrate through the adhesive layer by hot pressing to obtain the template.

On the basis of treating the film material by ion track etching to obtain the through holes, the adhesive layer is screen-printed or sprayed on the film material formed with the through holes, and the adhesive layer is subjected to special perforation to ensure the adhesive layer to completely or partially expose the through holes, thereby ensuring the adhesive layer not to completely cover the through holes and avoiding isolation between the through holes and the substrate. Then, the film material formed with the through holes is bonded to the substrate through the perforated adhesive layer by hot pressing, so that the film material is reliably connected to the substrate, and the through holes between the film material and the substrate are not completely covered by the adhesive layer, thereby ensuring the communication between the through holes and the substrate.

Preferably, the adhesive layer does not cover the through holes at all, so that there will be no excess residual adhesive between the through holes and the substrate, which can prevent the excess residual adhesive from affecting the electrical contact between the subsequently synthesized one-dimensional columnar structure materials and the substrate, including causing an increase of the impedance of the overall structure of the one-dimensional columnar structure materials and the substrate and further affecting the performance of the subsequent lithium secondary battery electrode material.

In a second embodiment, the manufacturing method for a template includes the following steps: applying the adhesive layer to the film material not formed with the through holes, and treating the film material with the adhesive layer by ion track etching such that both the adhesive layer and the film material are formed with the through holes; and bonding the film material formed with the through holes to the substrate through the adhesive layer formed with the through holes by hot pressing to obtain the template.

According to this embodiment, first, the adhesive layer is applied to the film material, such that the adhesive layer is uniformly and densely spread on the film material, and the reliability of connection between the film material and the substrate can be improved by the subsequent bonding by hot pressing. Then, the film material and the adhesive layer are perforated by ion track etching, so that both the film material and the adhesive layer are formed with the through holes, which ensures the communication between the through holes and the substrate, thereby ensuring good electrical contact between the one-dimensional columnar structure materials subsequently prepared by using this template and the substrate.

In a third embodiment, the manufacturing method for a template includes the following steps:

applying the adhesive layer to the film material not formed with the through holes;

bonding the film material formed with the adhesive layer to the substrate through the adhesive layer by hot pressing; and treating the film material bonded to the substrate and the adhesive layer by ion track etching such that the film material and the adhesive layer are formed with the through holes.

According to this embodiment, first, the adhesive layer is applied to the film material and hot-pressed to improve the reliability of connection between the film material and the substrate, and then the laminated template is perforated. Specifically, the film material and the adhesive layer are perforated such that both the film material and the adhesive layer are formed with the through holes, which ensures the communication between the through holes and the substrate, thereby ensuring good electrical contact between the one-dimensional columnar structure materials subsequently prepared by using this template and the substrate.

According to the three embodiments above, the perforation of the film material, or the film material and the adhesive layer is mainly realized by ion track etching, which is a conventional process. However, some key parameters in this process may have a critical impact on important parameters of the through holes, such as hole diameter and hole arrangement density, which may play an important role during the subsequent preparation of the one-dimensional columnar structure materials on the template by using the through holes and the preparation of the lithium secondary battery electrode. Therefore, in this example of this application, a lot of research has been conducted on the key parameters of the ion track etching.

In this example of this application, conditions of the ion track etching include: using heavy ion bombardment, irradiation is carried out under an irradiation power of 2000 KW to 10000 KW for 0.5 s to 200 s. In addition, an etching solution used in the ion track etching is an alkaline solution. For example, a 10 wt % to 50 wt % sodium hydroxide etching solution is used to etch the film material, or the film material and the adhesive layer for 5 min to 30 min. In addition, the adhesive layer may be etched by a different etching solution according to the type of the adhesive layer used. When the adhesive layer is PVDF, the etching solution may be an N-methylpyrrolidone (NMP) etching solution.

When the irradiation power and the irradiation time are within the above ranges, the through holes having hole density and hole diameter suitable for the preparation of the lithium secondary battery electrode can be obtained. In addition, when the concentration and the etching time of the etching solution are within the above ranges, it is easy to control the through holes to have an appropriate etching depth, and thereby, by controlling this parameter, the height of the subsequent one-dimensional columnar structure materials can be controlled.

The irradiation power is 2000 KW to 10000 KW, including any value within this power range. For example, the irradiation power is 2000 KW, 3000 KW, 5000 KW, 6000 KW, 8000 KW or 10000 KW. The irradiation time is 0.5 s to 200 s, including any value within this time range. For example, the irradiation time is 0.5 s, 1 s, 5 s, 10 s, 20 s, 50 s, 60 s, 80 s, 100 s, 120 s, 150 s, 180 s or 200 s.

In another optional embodiment, the manufacturing method for a template includes the following steps:

treating the film material by ion track etching to obtain the through holes;

pre-plating a first metal layer on the film material formed with the through holes by physical vapor deposition; and electroplating a second metal layer on the first metal layer to form the substrate such that the film material formed with the through holes is plated with the substrate to form the template.

In this example of this application, the adhesive layer may be arranged and subjected to special perforation to ensure the reliability of connection between the film material and the substrate and the communication between the through holes and the substrate, thereby ensuring good electrical contact between the one-dimensional columnar structure materials subsequently generated in the through holes and the substrate, or the film material may be perforated by ion track etching first, and then the substrate may be formed on the film material formed with the through holes. Specifically, in this example of this application, first, the thin first metal layer may be pre-plated by physical vapor deposition so as to create as good electron channels as possible in the through holes of the film material, and this process does not require the metal layer to densely cover the film layer. Then, the second metal layer is further electroplated on the thin first metal layer. The overall thickness of the metal layers is increased by electroplating, thereby improving the structural strength of the substrate. It can be understood that the first metal layer and the second metal layer may use the same or different metals, preferably the same metal. For example, both the first metal layer and the second metal layer are copper layers.

It should be noted that if the first metal layer is directly pre-plated on the film material formed with the through holes by physical vapor deposition and the second metal layer for increasing the thickness is not electroplated, the template formed by the substrate and the film material cannot be formed, and the specific intermediate structure and lithium secondary battery electrode cannot be obtained in the subsequent manufacturing process. This is because if only the first metal layer is pre-plated on the film material formed with the through holes by physical vapor deposition, only the metal coating on the surface of the film material can be obtained, and the through holes cannot be covered, i.e., the film material having the through holes and plated with the first metal layer is obtained after the pre-plating. This thin metal layer (having a thickness of about <1 μm), which is porous and not dense, can provide limited electron channels and cannot function as an effective structural support. If one-dimensional nanowires are directly prepared on this basis, then a conductive material is electrodeposited in the through holes and the film material is removed. However, only one-dimensional nanowires or bundles of wires agglomerating in small area can be obtained, and one-dimensional columnar structures perpendicularly grown on the conductive substrate cannot be obtained.

However, the purpose of this example of this application is not to obtain the one-dimensional nanowires, but to prepare a lithium secondary battery electrode structure different from the conventional structure by using the conductive substrate on which one-dimensional columnar structures are perpendicularly grown as an intermediate structure. Therefore, in this example of this application, after the first metal layer is pre-plated, the second metal layer for increasing the thickness is further electroplated on the first metal layer. By pre-plating the first metal layer, the insulated film material has certain electron channels, which provides good electrical conditions for electroplating the second metal layer for increasing the thickness. By the electroplating, the thick and dense second metal layer can be attached. The second metal layer is mainly used as a conductive substrate that can provide good electrical conductivity and good structural support.

With the above manufacturing method for the template, the substrate having the following characteristics can be obtained. In the substrate, a hole diameter of the through holes is 10 nm to 50 μm, a thickness of the film material is 2 μm to 50 μm, a hole density of the through holes is $10^5$/cm$^2$ to $10^8$/cm$^2$, and a length-to-diameter ratio of the thickness of the film material to the hole diameter of the through holes is 1:3 to 3:1. Preferably, the hole diameter of the through holes is 5 μm to 30 μm, the thickness of the film material is 15 μm to 50 μm, the hole density of the through holes is 0.4 million/cm$^2$ to 2 million/cm$^2$, and the length-to-diameter ratio of the thickness of the film material to the hole diameter of the through holes is 1:1 to 3:1. The template having structural parameters within such ranges has better performance in the lithium secondary battery electrode prepared subsequently.

The hole diameter of the through holes is 10 nm to 50 μm, including any value within this hole diameter range. For example, the hole diameter of the through holes is 10 nm, 20 nm, 50 nm, 100 nm, 200 nm, 500 nm, 1 μm, 5 μm, 10 μm, 15 μm, 20 μm, 25 μm, 30 μm, 35 μm, 40 μm, 45 μm or 50 am. The thickness of the film material is 2 μm to 50 μm, including any value within this thickness range. For example, the thickness of the film material is 2 μm, 5 μm, 10 μm, 15 μm, 20 μm, 25 μm, 30 μm, 35 μm, 40 μm, 45 μm or 50 μm. The hole density of the through holes is $10^5$/cm$^2$ to $10^8$/cm$^2$, including any value within this density range. For example, the hole density of the through holes is $10^5$/cm$^2$, $10^6$/cm$^2$, $10^7$/cm$^2$ or $10^8$/cm$^2$. The length-to-diameter ratio of the thickness of the film material to the hole diameter of the through holes is 1:3 to 3:1, including any value within this ratio range. For example, the length-to-diameter ratio of the thickness of the film material to the hole diameter of the through holes is 1:3, 1:2, 1:1, 2:1 or 3:1. It should be noted that the length-to-diameter ratio in this example of this application refers to the ratio of the thickness of the film material to the hole diameter of the through holes, i.e., the "length" refers to the thickness of the film material, and the "diameter" refers to the hole diameter of the through holes, and also the diameter of the through hole.

According to the structural parameters of the through holes formed, this example of this application can obtain micron-sized through hole structures on the flexible polymer thin film by ion track etching, which can meet the requirements for the subsequent preparation of the one-dimensional columnar structure materials and the lithium secondary battery electrode, so that the lithium secondary battery electrode can have better performance advantages than ordinary lithium secondary battery electrodes due to the formation of the one-dimensional micro-sized structures.

The hole diameter of the through holes, the thickness of the film material and the length-to-diameter ratio determine the diameter, height and height-to-diameter ratio of the one-dimensional columnar structure materials subsequently grown in the through holes, which will further affect related performance of the lithium secondary battery electrode. From the perspective of the preparation of lithium secondary battery electrodes and their application in lithium batteries, the larger the length-to-diameter ratio, the better. However, the applicant found that when the length-to-diameter ratio exceeds the range of 1:3 to 3:1, it is required to make the thickness of the film material larger and/or make the hole diameter of the through holes smaller, which not only increases the etching difficulty, but also makes it difficult to ensure the rigidity of the one-dimensional columnar structure materials subsequently grown in the through holes, making them prone to breakage. Therefore, in this application, by controlling the key parameters of the ion track etching, such as irradiation power, irradiation time, etching solution concentration and etching time, the length-to-diameter ratio of the thickness of the film material to the hole diameter of the through holes is controlled within the range of 1:3 to 3:1, preferably 1:1 to 3:1, which helps to reduce the etching difficulty, can ensure the rigidity of the one-dimensional columnar structure materials grown subsequently and can also make the one-dimensional columnar structure materials optimize the performance of the further prepared lithium secondary battery electrode.

In still another optional embodiment, the manufacturing method for a template includes the following steps:

carrying out an impurity removal pretreatment on the substrate;

applying a dry film to one surface and/or two surfaces of the pretreated substrate; and exposing, developing and etching the dry film to obtain the template with the dry film formed with the through holes.

In addition to using the specially treated adhesive layer or directly forming the substrate on the film material with the through holes, in this example of this application, dry film etching on the substrate may also be used to laminate the film material and the substrate. In the related art, an insulating substrate is usually used in the dry film etching. It is required to form a conductive thin film on the insulating substrate and apply a dry film and a photoresist before etching. However, this example of this application is to be applied to the preparation of the lithium secondary battery electrode, so a conductive substrate is directly used as the substrate, and there is no need to additionally form a conductive film, which simplifies the process and is more conducive to reducing the mass production cost of the template and the lithium secondary battery electrode prepared subsequently.

With the above manufacturing method for the template, the substrate having the following characteristics can be obtained. In the substrate, a hole diameter of the through holes is 5 μm to 30 μm, a thickness of the film material is 5 μm to 30 μm, a length-to-diameter ratio of the thickness of the film material to the hole diameter of the through holes is 1:3 to 3:1, and a hole spacing between the adjacent through holes is 5 μm to 20 μm.

The hole diameter of the through holes is 5 μm to 30 μm, including any value within this hole diameter range. For example, the hole diameter of the through holes is 5 μm, 10 μm, 15 μm, 20 μm, 25 μm or 30 μm. The thickness of the film material is 5 μm to 30 μm, including any value within this thickness range. For example, the thickness of the film material is 5 μm, 10 μm, 15 μm, 20 μm, 25 μm or 30 μm. The length-to-diameter ratio of the thickness of the film material to the hole diameter of the through holes is 1:3 to 3:1, including any value within this ratio range. For example, the length-to-diameter ratio of the thickness of the film material to the hole diameter of the through holes is 1:3, 1:2, 1:1, 2:1 or 3:1. It should be noted that the length-to-diameter ratio in this example of this application refers to the ratio of the thickness of the film material to the hole diameter of the through holes, i.e., the "length" refers to the thickness of the film material, and the "diameter" refers to the hole diameter of the through holes, and also the diameter of the through hole. In addition, the hole spacing between the adjacent through holes is 5 μm to 20 μm, including any value within this hole spacing range. For example, the hole spacing between the adjacent through holes is 5 μm, 8 μm, 10 μm, 12 μm, 15 μm, 18 μm or 20 μm.

According to the structural parameters of the through holes formed, this example of this application can obtain micron-sized through hole structures on the flexible polymer thin film by ion track etching, which can meet the requirements for the subsequent preparation of the one-dimensional columnar structure materials and the lithium secondary battery electrode, so that the lithium secondary battery electrode can have better performance advantages than ordinary lithium secondary battery electrodes due to the formation of the one-dimensional micro-sized structures.

The hole diameter of the through holes, the thickness of the film material and the length-to-diameter ratio determine the diameter, height and height-to-diameter ratio of the one-dimensional columnar structure materials subsequently grown in the through holes, which will further affect related performance of the lithium secondary battery electrode. From the perspective of the preparation of lithium secondary battery electrodes and their application in lithium batteries, the larger the length-to-diameter ratio, the better. However, the applicant found that when the length-to-diameter ratio exceeds the range of 1:3 to 3:1, it is required to make the thickness of the film material larger and/or make the hole diameter of the through holes smaller, which not only increases the etching difficulty, but also makes it difficult to ensure the rigidity of the one-dimensional columnar structure materials subsequently grown in the through holes, making them prone to breakage. Therefore, in this application, by controlling the key parameters of the ion track etching, such as irradiation power, irradiation time, etching solution concentration and etching time, the length-to-diameter ratio of the thickness of the film material to the hole diameter of the through holes is controlled within the range of 1:3 to 3:1, preferably 1:1 to 3:1, which helps to reduce the etching difficulty, can ensure the rigidity of the one-dimensional columnar structure materials grown subsequently and can also make the one-dimensional columnar structure materials optimize the performance of the further prepared lithium secondary battery electrode.

In addition, when the hole spacing between the adjacent through holes is controlled within the above range, a favorable deposition space can be provided for the subsequent covering of the active material in the lithium secondary battery electrode. If the hole spacing is less than 5 μm, there will be too many through holes, and the through holes will be distributed too densely. This can provide a large active area for the attachment of the electrode active material, but the gap reserved for the one-dimensional columnar structure materials will be too small, which is not conducive to further deposition of the electrode active material on peripheral walls of the one-dimensional columnar structure materials. On the contrary, if the hole spacing is greater than 20 μm, the density of the through holes will be too low, which can provide a limited area for the attachment of the electrode active material, thereby affecting the loading level of the subsequent electrode active material and further affecting the capacity and other properties of the lithium secondary battery electrode.

The template prepared in this example of this application can be used for preparing an intermediate structure of a lithium secondary battery electrode, and further, the intermediate structure can be used for a lithium secondary battery electrode. Since the manufacturing method for a template is low in process cost and can realize large-area mass production, manufacturing methods for the intermediate structure and the lithium secondary battery electrode by using the template can also realize mass production, and the lithium secondary battery electrode obtained by mass production has good electrode performance, which can effectively solve the problem that the active material such as silicon, when serving as a lithium secondary battery negative electrode, has poor cycling performance due to volume expansion. Specific methods and structures for manufacturing the intermediate structure and the lithium secondary battery electrode by using the template will be further described below.

In a second aspect, an example of this application further provides an intermediate structure of a lithium secondary battery electrode. The intermediate structure includes a substrate and one-dimensional columnar structures perpendicularly grown on the substrate. The manufacturing method for an intermediate structure includes the following steps: growing a conductive material in through holes of the template prepared according to the first aspect such that one-dimensional columnar structures are formed in the through holes; and removing a film material in the template to obtain the intermediate structure.

Since the template provided in this example of this application can be mass-produced, by using the template that can be mass-produced, the intermediate structure for preparing the lithium secondary battery electrode can be obtained simply by growing the one-dimensional columnar structures in the through holes and removing the film material. This process can also realize mass production, thereby realizing mass production of the lithium secondary battery electrode. In addition, since the through holes are in good communication with the substrate in the template prepared in the first aspect, there is a good electrical contact environment between the conductive one-dimensional columnar structures grown in the through holes and the substrate, so that the one-dimensional columnar structures can provide good structural support and good electrical conductivity during the subsequent preparation of the lithium secondary battery electrode.

In addition, the applicant would like to emphasize that as mentioned in the template and the manufacturing method therefor in the first aspect, the film material with through holes may be laminated on one surface of the substrate, or the film material with through holes may be respectively laminated on two surfaces of the substrate. In the case where the film material with through holes is respectively laminated on two surfaces of the substrate, during the preparation of the intermediate structure of a lithium secondary battery electrode, the one-dimensional columnar structures are grown in the through holes on the upper and lower surfaces of the substrate, i.e., the one-dimensional columnar materials are obtained on the two surfaces of the substrate.

Optionally, the conductive material is grown in the through holes by one of physical vapor deposition, electroplating, chemical plating or chemical vapor deposition. Optionally, the conductive material is at least one of copper, nickel or carbon. Optionally, the film material is removed by one of mechanical stripping, chemical etching or vacuum sintering.

When the conductive material is a metal such as copper or nickel, the copper or nickel may be deposited in the through holes of the template by physical vapor deposition (such as magnetron sputtering or evaporation), electroplating or chemical plating, and the obtained intermediate structure may be, for example, copper foil substrate-copper column one-dimensional columnar structures, copper foil substrate-nickel column one-dimensional columnar structures, nickel foil substrate-nickel column one-dimensional columnar structure, nickel foil substrate-copper column one-dimensional columnar structures or the like, and may also be copper foil substrate-carbon-based one-dimensional columnar structures or the like. When the substrate and the film material have good temperature resistance, the one-dimensional columnar structures may also be grown by chemical vapor deposition.

According to the intermediate structure of a lithium secondary battery electrode prepared by the above manufacturing method, Since the one-dimensional columnar structures are grown in the through holes of the template, the structural parameters of the one-dimensional columnar structures are close to those of the through holes. A diameter of the one-dimensional columnar structures is 5 m to 30 µm, a height of the one-dimensional columnar structures is 15 µm to 50 µm, and a height-to-diameter ratio of the one-dimensional columnar structures is 3:1 to 1:1. When the structural parameters of the one-dimensional columnar structures are controlled within the above ranges, the difficulty in the mass production process and the performance of the finally prepared lithium secondary battery electrode can be well balanced, and the lithium secondary battery electrode with stable structural parameters and optimized performance can be prepared by a relatively stable and easily achievable mass production process.

The diameter of the one-dimensional columnar structures is 5 µm to 30 µm, including any value within this diameter range. For example, the diameter of the one-dimensional columnar structures is 5 µm, 10 µm, 15 µm, 20 µm, 25 µm or 30 µm. The height of the one-dimensional columnar structures is 15 µm to 50 µm, including any value within this height range. For example, the height of the one-dimensional columnar structures is 15 µm, 20 µm, 25 µm, 30 µm, 35 µm, 40 µm, 45 µm or 50 m. The height-to-diameter ratio of the one-dimensional columnar structures is 3:1 to 1:1, including any value within this height-to-diameter ratio. For example, the height-to-diameter ratio of the one-dimensional columnar structures is 3:1, 2.5:1, 2:1, 1.5:1 or 1:1.

Further, the one-dimensional columnar structures may be regularly or irregularly distributed on the substrate according to a manufacturing method for the template. In the art, both regularly and irregularly distributed one-dimensional columnar structures can be called columnar array structures. When the one-dimensional columnar structures are regularly distributed on the substrate, the one-dimensional columnar structures include a plurality of regularly distributed columns, and a spacing between the adjacent columns is 5 µm to 20 µm.

The spacing between the adjacent columns is 5 µm to 20 µm, including any value within this hole spacing range. For example, the spacing between the adjacent columns is 5 µm, 8 µm, 10 µm, 12 µm, 15 µm, 18 µm or 20 µm.

The applicant found that when the spacing between the adjacent columns is greater than 20 m, the quantity of the one-dimensional columnar structures in unit area on the substrate is too small, the space utilization rate is low, and the surface area for subsequent deposition of the electrode active material is small. When the spacing between the adjacent columns is less than 5 µm, the distance between the adjacent columns is too small, which will increase the difficulty in the subsequent deposition of the active material on the side wall of the column and/or further covering of other materials and lead to insufficient space reserved for radial expansion of the electrode active material during charge-discharge cycling, which is not conducive to performance optimization of the lithium battery.

In a third aspect, an example of this application further provides a lithium secondary battery electrode, including:

a substrate, the substrate being a conductive substrate;

one-dimensional columnar structures, growing on the substrate and perpendicular to a plane where the substrate is located, the one-dimensional columnar structures being conductive one-dimensional columnar structures;

an active material layer, located on the substrate and perpendicular to the plane where the substrate is located, and covering an outer surface of each of the one-dimensional columnar structures; and a protective layer, located on the substrate and perpendicular to the plane where the substrate is located, and covering an outer surface of the active material layer.

The manufacturing method for a lithium secondary battery electrode includes the following steps:

growing a conductive material in through holes of the template prepared according to the first aspect such that one-dimensional columnar structures are formed in the through holes; and removing a film material in the template to obtain an intermediate structure in which the one-dimensional columnar structures are grown on a substrate;

covering an outer surface of each of the one-dimensional columnar structures with an electrode active material to form an active material layer; and covering an outer surface of the active material layer with a protective layer to obtain the lithium secondary battery electrode.

Optionally, the electrode active material is at least one of silicon, germanium or tin. Optionally, a material of the protective layer is carbon or metal oxide. Optionally, the outer surface of each of the one-dimensional columnar structures is covered with the electrode active material by chemical vapor deposition, physical vapor deposition or electroplating. Optionally, the outer surface of the active material layer is covered with the protective layer by a hydrothermal process, physical vapor deposition or chemical vapor deposition.

The lithium secondary battery electrode structure is an electrode material in which the one-dimensional columnar structures are coaxially laminated. The substrate is used as a current collector of the lithium secondary battery electrode. The one-dimensional columnar structures are arranged perpendicular to the current collector, and the outer surface of the one-dimensional columnar structure, which serves as a core layer, is sequentially covered with the active material layer and the protective layer for forming the lithium secondary battery electrode. Compared with the battery structure in which the electrode active material is laid flat on the current collector, this structure in which all the one-dimensional columnar structures are perpendicular to the current collector can improve the overall conductive environment of the lithium secondary battery electrode.

Specifically, the one-dimensional columnar structure, which serves as the core layer perpendicular to the substrate, can play an effective supporting role and provide a conductive channel for charging and discharging electrons perpendicular to the substrate, and when the one-dimensional columnar structure is used in the lithium secondary battery electrode structure, there is no need for an additional conductive agent. The active material layer of the electrode can directly cover the surface of the substrate and the core layer by physical vapor deposition, chemical vapor deposition, electroplating or the like, and there is no need for an additional binder. The outermost protective layer keeps coaxial with the one-dimensional columnar structure core layer and the active material layer.

The electrode active material in the lithium battery electrode having a coaxial structure may be at least one of silicon, silicide, germanium or tin. In particular, when silicon, silicide or the like is used as the active material layer, the obtained columnar array structure electrode active material not only has the advantage of high capacity per gram (the theoretical maximum lithium intercalation capacity of a silicon negative electrode material is up to 4200 mAh/g), but also can solve the problem of poor conductivity of the silicon-based negative electrode material by utilizing good electrical contact between the conductive core layer and the conductive substrate. In addition, the presence of axial gaps between adjacent columns of the one-dimensional columnar structures can effectively buffer the volume change of the active material layer during charging and discharging, release stress and improve cycling stability.

In addition, the protective layer may cover the outside of the active material layer by a hydrothermal process, physical vapor deposition, chemical vapor deposition or the like, and a thickness of the protective layer is less than a thickness of the active material layer, i.e., the protective layer has a smaller thickness. Thus, the presence of the protective layer can effectively avoid direct contact between the active material layer and the electrolyte in the lithium secondary battery, thereby reducing the irreversible loss of the lithium source and further suppressing the volume expansion during cycling.

In order to explain the technical solutions and technical effects of this application in more detail, the examples of this application will be further explained through more specific examples, application examples and performance test results.

Example I

As shown in FIG. 1, this example provides a template for preparing a lithium secondary battery electrode on one surface. The template includes a copper foil substrate 1 and a film material 2 laminated on one surface of the copper foil substrate 1. The film material 2 has through holes 21, and central axes of the through holes 21 are perpendicular to a plane where the substrate 1 is located. The film material 2 is a flexible PC thin film.

Figure 2:
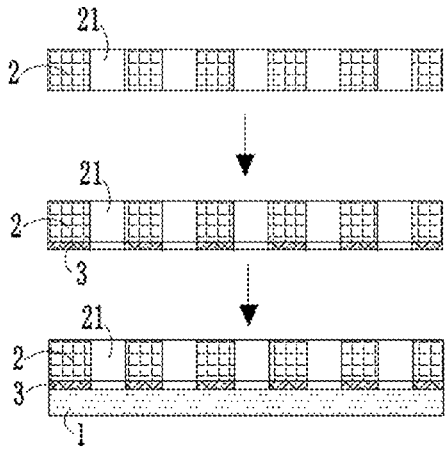
FIG. 2 is a diagram of a manufacturing process for a template according to Example I.

As shown in FIG. 2, a manufacturing method for a template includes the following steps:

Perforation: The film material 2 is treated by ion track etching to obtain the through holes 21, and the adhesive layer 3 is screen-printed on the film material 2 having the through holes 21. The adhesive layer 3 does not cover the through holes 21 such that the through holes 21 are exposed. The conditions of the ion track etching include: using heavy ion bombardment, irradiation is carried out under an irradiation power of 5000 KW for 200 s, and a 20 wt % sodium hydroxide solution is used as an etching solution to etch the film material 2 for 20 min such that the film material 2 is formed with the through holes 21. The adhesive layer 3 is PVDF, and for this adhesive layer 3, an NMP etching solution is used to etch the adhesive layer 3 such that the adhesive layer 3 does not cover the through holes 21 of the film material 2.

Hot pressing: The film material 2 formed with the adhesive layer 3 is bonded to the copper foil substrate 1 through the adhesive layer 3 by hot pressing to obtain the template. Since the adhesive layer 3 is subjected to special perforation, the through holes 21 of the template are in communication with the copper foil substrate 1.

Figure 3:
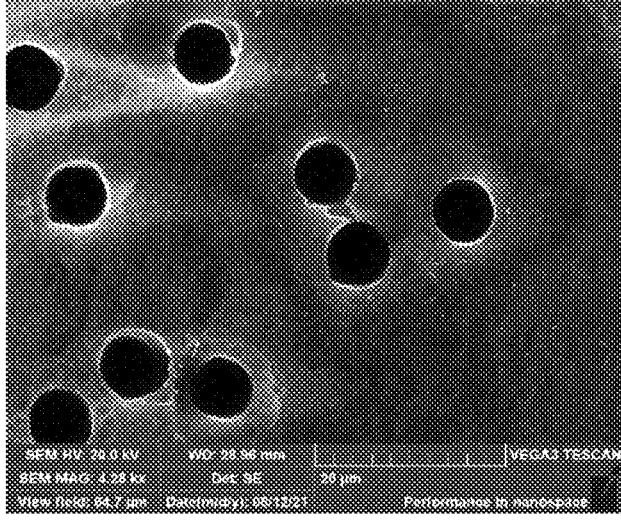
FIG. 3 is a SEM image of the template according to Example I.

According to the template obtained by the above manufacturing method, a hole diameter of the through holes 21 is 5 μm to 10 μm, a thickness of the film material 2 is 15 μm, and a hole density of the through holes 21 is $4\times10^{6}/cm^{2}$. FIG. 3 shows a SEM image of the template according to this example. As can be seen from the figure, the through holes obtained in this example are irregularly distributed in the film material.

It should be noted that although the through holes obtained by ion track etching are irregularly distributed, as the template of this example will be used for manufacturing the lithium secondary battery electrode and the intermediate structure having one-dimensional columnar structures, i.e., the template will be used in the field of lithium secondary battery electrode materials, the quantity of the through holes in the film material is particularly important for this template. This is because the quantity of the through holes in the template determines the quantity of the one-dimensional columnar structures grown in the through holes during the subsequent preparation of the intermediate structure, and further determines the loading level of the active material in the finally prepared lithium secondary battery electrode, which directly affects the performance of the electrode. In addition, in terms of the regularity of distribution of the through holes, the distribution of the through holes can be made closer to regular uniform distribution to some extent by increasing the hole density. Specifically, in this example, the through holes in the template in FIG. 3 are irregularly distributed because they are magnified by a certain factor. However, since the hole density of the through holes can reach $4 \times 10^6/cm^2$, the template can meet the performance requirements for the subsequently prepared lithium secondary battery electrode in terms of the quantity of holes.

Figures 4, 5:
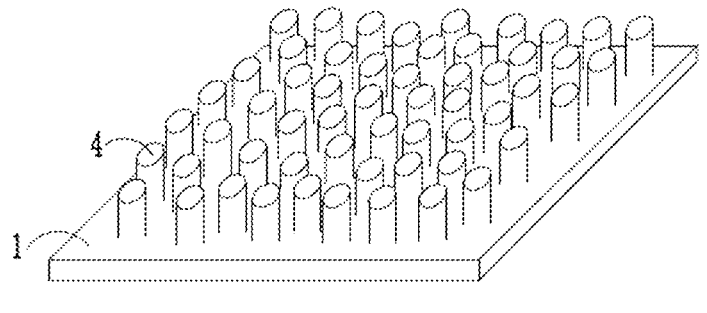
FIG. 4 is a schematic structural view of an intermediate structure of a lithium secondary battery electrode according to Example I.
FIG. 5 is a diagram of a manufacturing process for an intermediate structure of a lithium secondary battery electrode according to Example I.
Figures 6, 7:
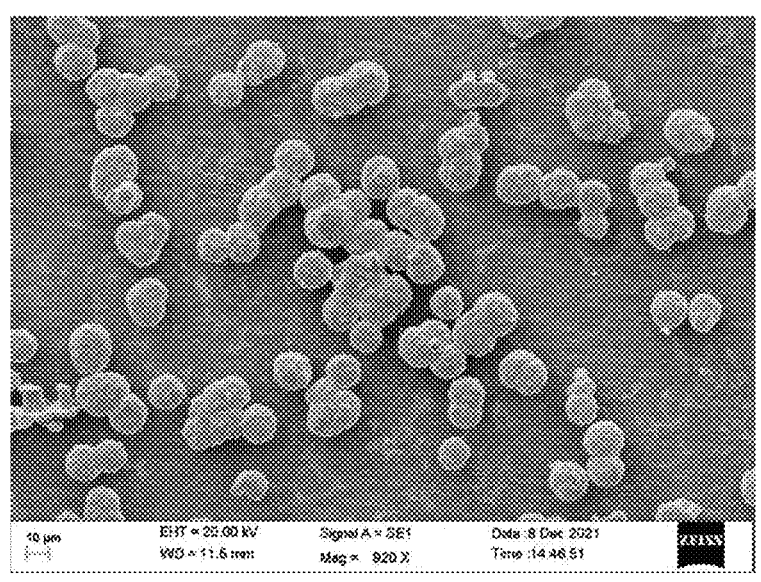
FIG. 6 is a SEM image of the intermediate structure of a lithium secondary battery electrode according to Example I.
FIG. 7 is a diagram of a manufacturing process for a lithium secondary battery electrode according to Example I.

This example further provides an intermediate structure of a lithium secondary battery electrode. As shown in FIG. 4, the intermediate structure includes a copper foil substrate 1 and one-dimensional copper column structures 4 perpendicularly grown on the copper foil substrate 1. As shown in FIG. 5, a manufacturing method for an intermediate structure includes the following steps: growing metallic copper in the through holes 21 of the template prepared in this example by physical vapor deposition such that the one-dimensional copper column structures 4 perpendicular to the copper foil substrate 1 are formed in the through holes 21; and removing the film material 2 of the template by mechanical stripping to obtain the intermediate structure, i.e., copper foil substrate 1-one-dimensional copper column structures 4. In the intermediate structure, the one-dimensional copper column structures 4 perpendicular to the copper foil substrate 1 have the following structural parameters: a diameter of the one-dimensional columnar structures is 5 μm to 10 μm, a height of the one-dimensional columnar structures is 15 μm, and a height-to-diameter ratio of the one-dimensional columnar structures is 3:1 to 3:2. FIG. 6 shows a SEM image of the intermediate structure according to this example.

This example further provides a lithium secondary battery electrode, specifically a lithium secondary battery negative electrode. As shown in FIG. 7, the lithium secondary battery electrode includes: a copper foil substrate 1, one-dimensional copper column structures 4, an active material layer 5 using silicon as an electrode active material and covering an outer surface of each of the one-dimensional copper column structures 4, and a carbon-based protective layer 6 covering an outer surface of the active material layer 5. The one-dimensional copper column structures 4 grow on the substrate 1 and are perpendicular to a plane where the copper foil substrate 1 is located. Both the active material layer 5 and the protective layer 6 are perpendicular to the plane where the copper foil substrate 1 is located and are located on the copper foil substrate 1. Thereby, the lithium secondary battery electrode, which includes the copper foil substrate 1 serving as a current collector, and the core layer one-dimensional copper column structures 4, the active material layer 5 and the protective layer 6 that are perpendicular to the copper foil substrate 1 and coaxially arranged, is formed.

As shown in FIG. 7, a manufacturing method for a lithium secondary battery electrode includes the following steps:

growing metallic copper in the through holes 21 of the template in this example such that the one-dimensional copper column structures 4 are formed in the through holes 21;

removing the film material 2 of the template to obtain the intermediate structure in which the one-dimensional copper column structures 4 are grown on the copper foil substrate 1;

covering an outer surface of each of the one-dimensional copper column structures 4 with a silicon electrode active material by physical vapor deposition to form an active material layer 5; and covering an outer surface of the active material layer 5 with a carbon-based protective layer 6 by physical vapor deposition to obtain the lithium secondary battery electrode.

Example II

This example is different from Example I in that the conditions of the ion track etching during the preparation of the template are different in this example. In this example, in the manufacturing method for a template, the conditions of the ion track etching include: using heavy ion bombardment, irradiation is carried out under an irradiation power of 10000 KW for 0.5 s, and a 50 wt % sodium hydroxide solution is used as an etching solution to etch the film material for 5 min such that the film material is formed with the through holes.

Example III

This example is different from Example I in that the conditions of the ion track etching during the preparation of the template are different in this example. In this example, in the manufacturing method for a template, the conditions of the ion track etching include: using heavy ion bombardment, irradiation is carried out under an irradiation power of 2000 KW for 20 s, and a 20 wt % sodium hydroxide solution is used as an etching solution to etch the film material for 30 min such that the film material is formed with the through holes.

Example IV

This example is different from Example I in that in this example, the substrate is a nickel foil substrate, the film material is a flexible PET thin film, and the manufacturing method for a template is different.

In this example, the manufacturing method for a template includes the following steps:

Adhesive application: the adhesive layer is applied to the film material not formed with the through holes such that the adhesive layer is uniform and dense.

Perforation: the film material with the adhesive layer is treated by ion track etching such that both the adhesive layer and the film material are formed with the through holes. The conditions of the ion track etching include: using heavy ion bombardment, irradiation is carried out under an irradiation power of 5000 KW for 200 s, and a 20 wt % sodium hydroxide solution is used as an etching solution to etch the film material for 20 min such that the film material is formed with the through holes. The adhesive layer is PVDF, and for this adhesive layer, an NMP etching solution is used to etch the adhesive layer such that the adhesive layer does not cover the through holes of the film material.

Hot pressing: the film material formed with the through holes is bonded to the nickel foil substrate through the film material with the through holes by hot pressing to obtain the template. Since the film layer and the adhesive layer are subjected to special perforation, the through holes of the template are in communication with the nickel foil substrate.

According to the template obtained by the above manufacturing method, a hole diameter of the through holes is 5 μm to 10 μm, a thickness of the film material is 15 μm to 50 μm, and a hole density of the through holes is $10^5/cm^2$ to $10^8/cm^2$.

Manufacturing methods for an intermediate structure of a lithium secondary battery electrode and a lithium secondary battery electrode by using the template of this example are the same as in Example I, and details will not be repeated here.

Example V

This example is different from Example I in that in this example, the film material is a flexible PI thin film, the manufacturing method for a template is different, and the one-dimensional columnar structures are one-dimensional nickel column structures.

In this example, the manufacturing method for a template includes the following steps:

Adhesive application: the adhesive layer is applied to the film material not formed with the through holes such that the adhesive layer is uniform and dense.

Hot pressing: the film material formed with the adhesive layer is bonded to the substrate through the adhesive layer by hot pressing.

Perforation: the film material bonded to the substrate and the adhesive layer are treated by ion track etching such that the film material and the adhesive layer are formed with the through holes. The conditions of the ion track etching include: using heavy ion bombardment, irradiation is carried out under an irradiation power of 5000 KW for 200 s, and a 20 wt % sodium hydroxide solution is used as an etching solution to etch the film material for 20 min such that the film material is formed with the through holes. The adhesive layer is PVDF, and for this adhesive layer, an NMP etching solution is used to etch the adhesive layer such that the adhesive layer does not cover the through holes of the film material.

Since the film layer and the adhesive layer are subjected to special perforation, the through holes of the template are in communication with the substrate.

According to the template obtained by the above manufacturing method, a hole diameter of the through holes is 5 μm to 10 μm, a thickness of the film material is 15 μm to 50 μm, and a hole density of the through holes is $10^5/cm^2$ to $10^8/cm^2$.

Manufacturing methods for an intermediate structure of a lithium secondary battery electrode and a lithium secondary battery electrode by using the template of this example are the same as in Example I, except that the one-dimensional columnar structures are one-dimensional nickel column structures, and details will not be repeated here.

Example VI

This example is different from Example I in that the manufacturing method for a template is different, and the electrode active material used in the active material layer in the lithium secondary electrode is different.

In this example, the manufacturing method for a template includes the following steps:

Perforation: the film material is treated by ion track etching to obtain the through holes.

Pre-plating: a first metal layer is pre-plated on the film material formed with the through holes by physical vapor deposition.

A second metal layer is electroplated on the first metal layer to form the substrate such that the film material formed with the through holes is plated with the substrate to form the template. Both the second metal layer and the first metal layer are copper layers, and a thickness of the second metal layer is greater than that of the first metal layer.

In addition, in the lithium secondary battery electrode, the active material layer uses a germanium active material.

Example VII

This example is different from Example I in that the manufacturing method for a template is different, and the electrode active material used in the active material layer in the lithium secondary battery electrode is different.

In this example, the manufacturing method for a template includes the following steps:

Pretreatment: an impurity removal pretreatment is carried out on the substrate, specifically including oil removal and impurity removal.

Dry film application: A dry film is applied to one surface of the pretreated substrate.

Perforation: the dry film is exposed, developed and etched to obtain the template with the dry film formed with the through holes.

According to the template obtained by the above manufacturing method, the through holes 21 are regularly distributed. A hole diameter of the through holes 21 is 5 μm to 30 μm, a thickness of the film material is 5 μm to 30 μm, a length-to-diameter ratio of the thickness of the film material to the hole diameter of the through holes is 1:3 to 3:1, and a hole spacing between the adjacent through holes is 5 μm to 20 μm.

In addition, in the lithium secondary battery electrode, the active material layer uses a tin active material.

Example VIII

Figure 8:
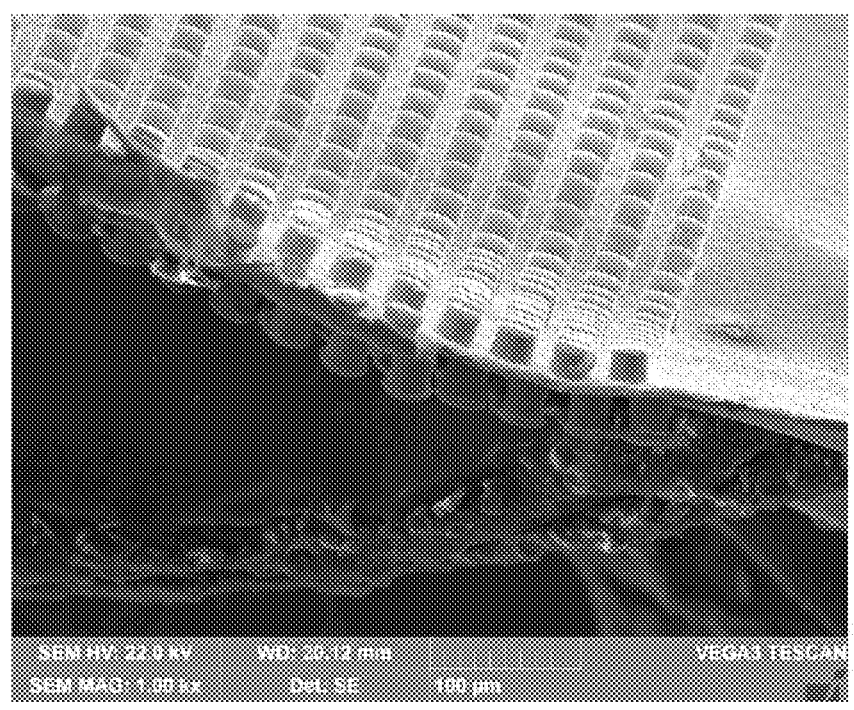
FIG. 8 is a SEM image of an intermediate structure of a lithium secondary battery electrode according to Example VIII.

This example is different from Example VII in that in this example, the film material with the through holes is respectively laminated on the upper and lower surfaces of the copper foil substrate, i.e., the template is a template with the through holes on the two surfaces. In the intermediate structure prepared by using the template of this example, the one-dimensional copper column structures are also grown on the two surfaces of the substrate. FIG. 8 shows a SEM image of the intermediate structure of a lithium secondary battery electrode according to this example. Further, in the lithium secondary battery electrode prepared by using the template of this example, the coaxial one-dimensional columnar structures are also formed on the two surfaces of the copper foil substrate.

COMPARATIVE EXAMPLE

This comparative example is different from Example I only in that this comparative example does not use a template to manufacture the intermediate structure and the lithium secondary battery electrode, but directly uses the same electrode manufacturing conditions as Example I to manufacture the lithium secondary battery electrode on the substrate. That is, in this comparative example, a silicon electrode active material is directly deposited on a copper foil substrate by physical vapor deposition to form an active material layer laid flat on the copper foil substrate, and then, a carbon-based protective layer is deposited on the active material layer by physical vapor deposition to obtain the lithium secondary battery electrode.

Performance Tests

Figure 9:
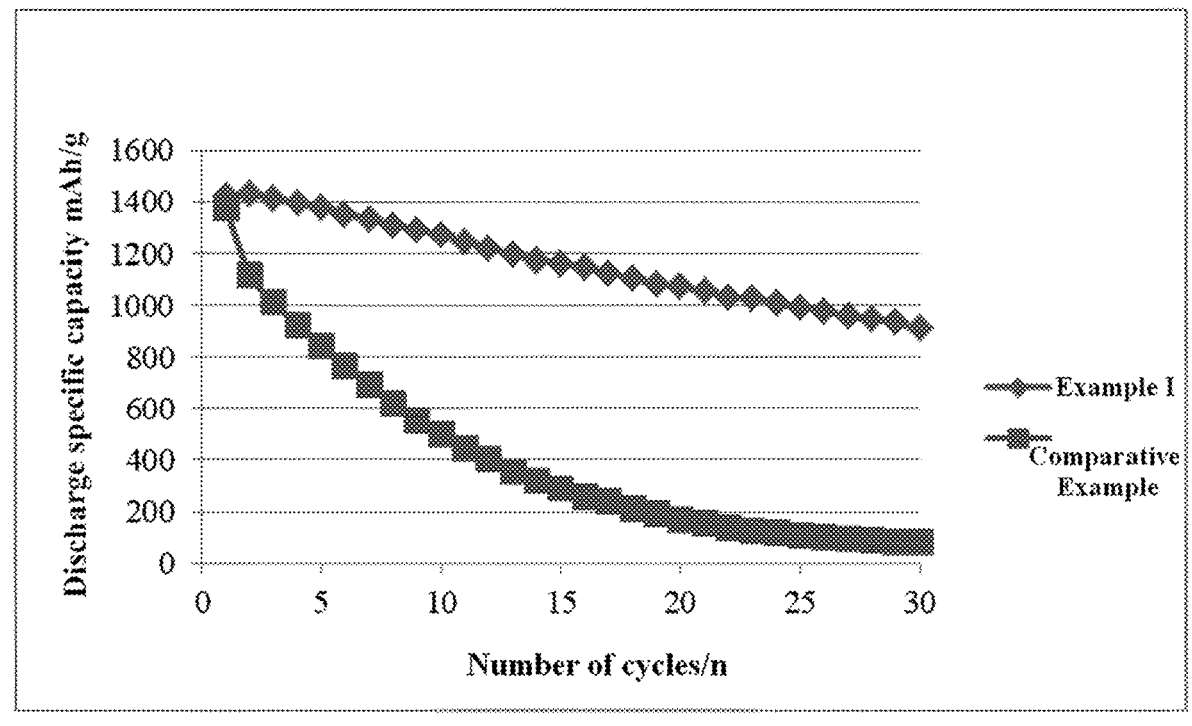
FIG. 9 is a diagram showing the results of cycling performance tests of button batteries assembled according to Example I and Comparative Example.

The lithium secondary battery electrodes in Example I and comparative example, which serve as a battery negative electrode, and other conventional lithium secondary battery materials are assembled into button batteries. The button batteries are subjected to cycling performance tests. The results are shown in FIG. 9. The results of the cycling performance tests show that the button battery assembled using the lithium secondary battery electrode of Example I has a capacity per gram of about 1426 mAh/g, and after 30 cycles, the discharge capacity retention is 64%. The button battery assembled using the lithium secondary battery electrode of the comparative example has an initial capacity per gram of about 1347 mAh/g, and after 30 cycles, the discharge capacity retention is only 6%.

As can be seen, in this comparative experiment, although the loading levels of the active materials on the lithium secondary battery electrodes in Example I and the comparative example are the same, causing the lithium secondary batteries assembled using these two lithium secondary battery electrodes to have similar initial capacities per gram, the discharge specific capacity of the lithium secondary battery in the comparative example decreases significantly with the progress of the cycling performance test experiment. This is because the battery negative electrode in the comparative example is a silicon thin film negative electrode. This silicon thin film negative electrode has large volume expansion during the charge-discharge cycling, which leads to separation and loss of electrical contact between the silicon particles and between the silicon and the copper foil current collector interface under stress, eventually causing rapid capacity fading and a discharge capacity retention after 30 cycles of only 6%. As can be seen from the results of the performance test on the lithium secondary battery electrode of Example I, in this example of this application, since the conductive material is perpendicularly grown on the copper foil current collector as the conductive one-dimensional columnar structures and the peripheral wall of the one-dimensional columnar structure material is sequentially covered with the silicon active material and the protective layer, the gap reserved between the adjacent one-dimensional columnar structures can effectively buffer the volume expansion of the silicon active material during the charge-discharge cycling and alleviate separation and loss of electrical contact due to the expansion of the silicon active material, thereby greatly improving the cycling stability of the lithium secondary battery.

The template for preparing a lithium secondary battery electrode as well as the manufacturing method and use, the intermediate structure of a lithium secondary battery electrode and the manufacturing method therefor, and the lithium secondary battery electrode and the manufacturing method therefor disclosed in the examples of this application have been described in detail. Herein, specific examples are used to explain the principles and embodiments of this application. The description of the examples above is merely used to help understand the technical solutions of this application and core concept thereof. Moreover, for those of ordinary skill in the art, according to the concept of this application, there will be changes in the specific embodiment and the scope of application. In summary, the content of this specification should not be construed as a limitation to this application.

What is claimed is:

1. A manufacturing method for an intermediate structure of a lithium secondary battery electrode, the manufacturing method for the intermediate structure comprising the following steps:

synthesizing a template: bonding a film material onto a substrate through an adhesive layer, and allowing both the film material and the adhesive layer to be formed with through holes, central axes of the through holes being perpendicular to a plane where the substrate is located; wherein the substrate is a conductive substrate, and the film material is a flexible polymer thin film, the polymer thin film is at least one of a poly tetra fluoroethylene (PTFE) thin film, a polyethylene glycol terephthalate (PET) thin film, a polypropylene (PP) thin film, a polycarbonate (PC) thin film or a polyimide (PI) thin film, a hole spacing between adjacent through holes is 5 μm to 20 μm, a ratio of a thickness of the film material to a hole diameter of the through holes is 1:3 to 3:1, the thickness of the film material is 2 μm to 50 μm, wherein the template is used for preparing the lithium secondary battery electrode on one surface or two surfaces of the template;

growing a conductive material in through holes such that one-dimensional columnar structures perpendicular to the substrate are formed in the through holes; and removing the film material in the template to obtain the intermediate structure, the one-dimensional columnar structures is used for coating an active material layer on an outer surface of the one-dimensional columnar structures, and an electrode active material of the active material layer includes at least one of silicon and silicide.

2. The manufacturing method for the intermediate structure according to claim 1, wherein the manufacturing method for the template comprises the following steps:

treating the film material by ion track etching to obtain the through holes, and printing or spraying the adhesive layer on the film material having the through holes; and bonding the film material formed with the adhesive layer to the substrate through the adhesive layer by hot pressing to obtain the template;

or, the manufacturing method for the template comprises the following steps:

applying the adhesive layer to the film material not formed with the through holes, and treating the film material with the adhesive layer by ion track etching such that both the adhesive layer and the film material are formed with the through holes; and bonding the film material formed with the through holes to the substrate through the adhesive layer formed with the through holes by hot pressing to obtain the template;

or, the manufacturing method for the template comprises the following steps:

applying the adhesive layer to the film material not formed with the through holes;

bonding the film material formed with the adhesive layer to the substrate through the adhesive layer by hot pressing; and treating the film material bonded to the substrate and the adhesive layer by ion track etching such that the film material and the adhesive layer are formed with the through holes.

3. The manufacturing method for the intermediate structure according to claim 2, wherein conditions of the ion track etching comprise: using heavy ion bombardment, irradiation being carried out under an irradiation power of 2000 KW to 10000 KW for 0.5 s to 200 s; and/or the conditions of the ion track etching comprise: an etching solution being an alkaline solution, and an etching time being 5 min to 30 min; and/or the adhesive layer being at least one of polyvinylidene difluoride (PVDF) or a conductive adhesive.

4. The manufacturing method for the intermediate structure according to claim 1, wherein the hole diameter of the through holes is 10 nm to 50 μm, and/or a hole density of the through holes is $10^5/cm^2$ to $10^8/cm^2$.

5. The manufacturing method for the intermediate structure according to claim 4, wherein the hole diameter of the through holes is 5 μm to 30 μm, and/or the hole density of the through holes is 0.4 million/cm² to 2 million/cm², and/or the thickness of the film material is 15 μm to 50 μm, and/or the ratio of the thickness of the film material to the hole diameter of the through holes is 1:1 to 3:1.

6. The manufacturing method for the intermediate structure according to claim 1, wherein the conductive material is grown in the through holes by one of physical vapor deposition, electroplating, chemical plating or chemical vapor deposition; and/or the conductive material is at least one of copper, nickel or carbon; and/or the film material is removed by one of mechanical stripping, chemical etching or vacuum sintering.

7. The manufacturing method for the lithium secondary battery electrode, comprising the following steps:

the intermediate structure is prepared by the manufacturing method for the intermediate structure according to claim 1;

covering the outer surface of each of the one-dimensional columnar structures with the electrode active material to form the active material layer; and covering an outer surface of the active material layer with a protective layer to obtain the lithium secondary battery electrode.

8. The manufacturing method for the lithium secondary battery electrode according to claim 7, wherein a material of the protective layer is carbon or metal oxide; and/or the outer surface of each of the one-dimensional columnar structures is covered with the electrode active material by chemical vapor deposition, physical vapor deposition or electroplating; and/or the outer surface of the active material layer is covered with the protective layer by a hydrothermal process, physical vapor deposition or chemical vapor deposition.

\* \* \* \* \*